J. Q. SMITH & A. B. HOOVER.
SECTIONAL FLOORING.
APPLICATION FILED OCT. 7, 1913.

1,110,833.

Patented Sept. 15, 1914.
4 SHEETS—SHEET 1.

Witnesses
Stuart Hilder.
Frances W. Anderson

Inventors
J. Q. Smith,
A. B. Hoover,
By E. W. Anderson &Son
their Attorneys

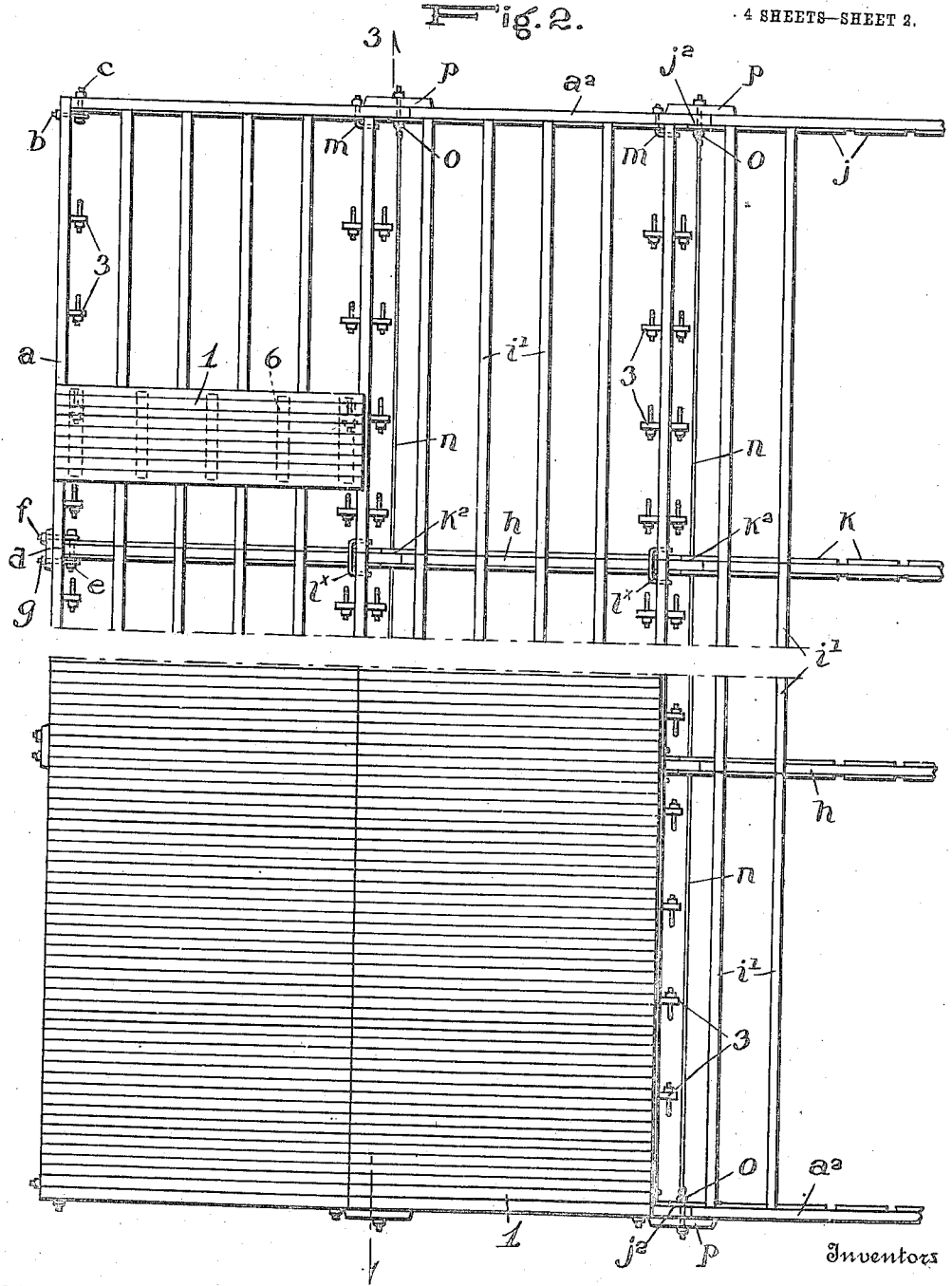

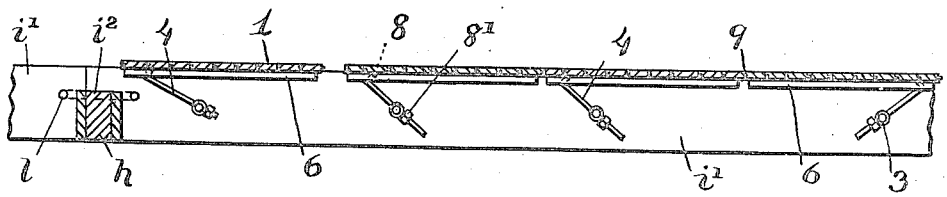
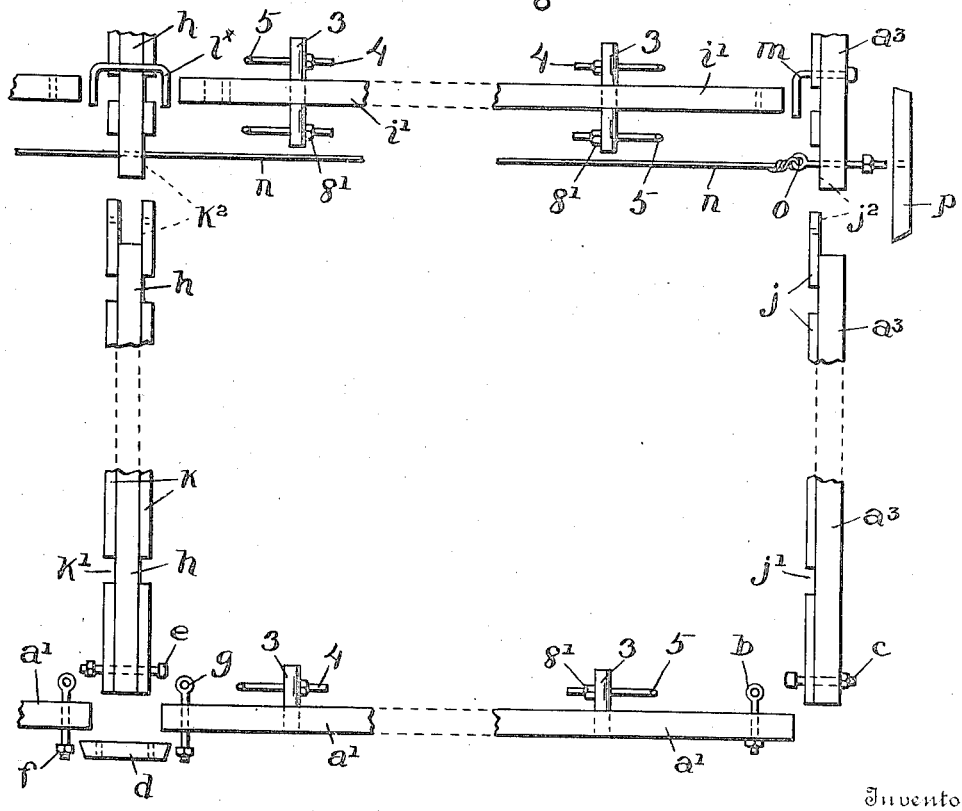

J. Q. SMITH & A. B. HOOVER.
SECTIONAL FLOORING.
APPLICATION FILED OCT. 7, 1913.

1,110,833.

Patented Sept. 15, 1914.

4 SHEETS—SHEET 4.

Witnesses
Stuart H. Felder.
Frances M. Anderson.

Inventors
J. Q. Smith
A. B. Hoover

By E. W. Anderson & Son
their Attorneys

UNITED STATES PATENT OFFICE.

JOHN QUINCY SMITH AND ARCHIE B. HOOVER, OF PAOLA, KANSAS.

SECTIONAL FLOORING.

1,110,833.

Specification of Letters Patent.   Patented Sept. 15, 1914.

Application filed October 7, 1913. Serial No. 793,913.

*To all whom it may concern:*

Be it known that we, JOHN QUINCY SMITH and ARCHIE B. HOOVER, citizens of the United States, residents of Paola, in the county of Miami and State of Kansas, have made a certain new and useful Invention in Sectional Flooring; and we declare the following to be a full, clear, and exact description of the same, such as will enable others skilled in the art to which it appertains to make and use the invention, reference being had to the accompanying drawings, and to letters or figures of reference marked thereon, which form a part of this specification.

Figure 1:
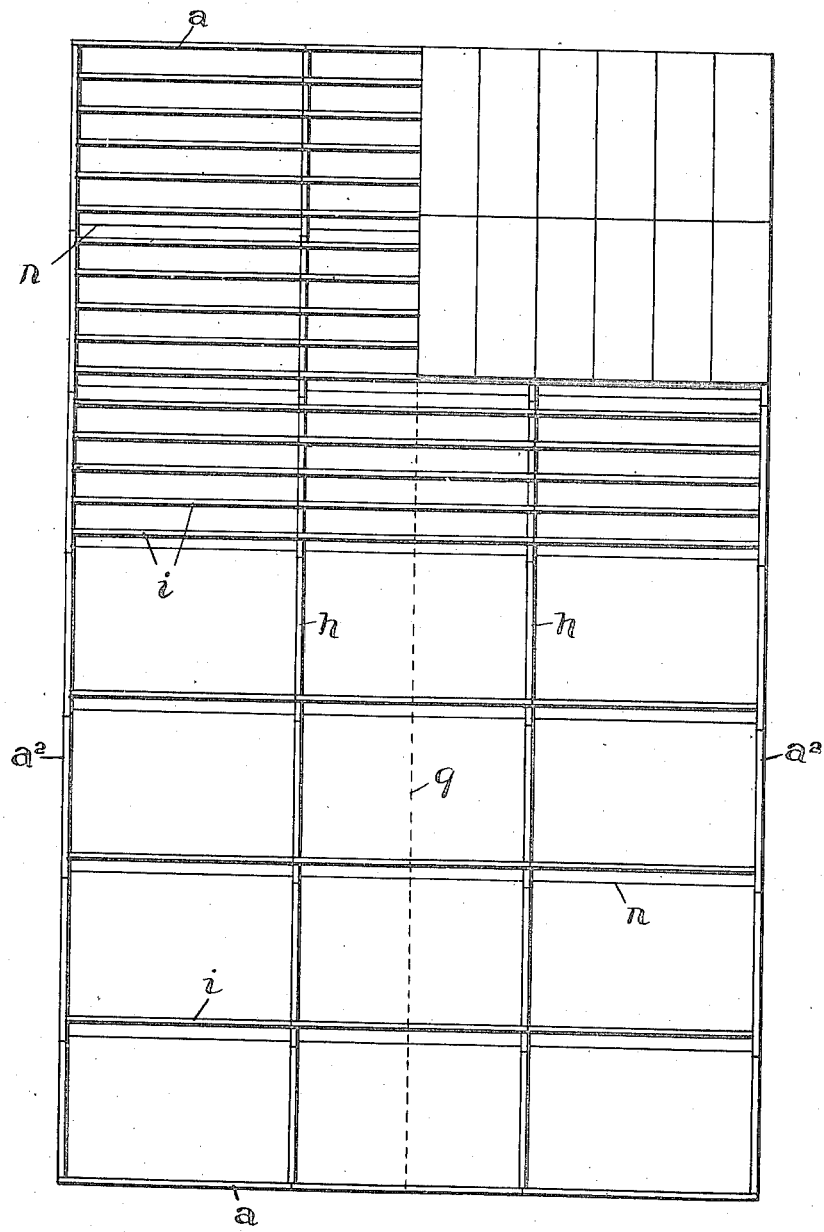
Figure 5:
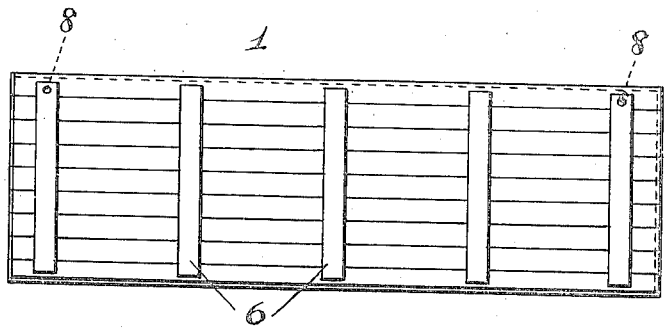
Figure 6:
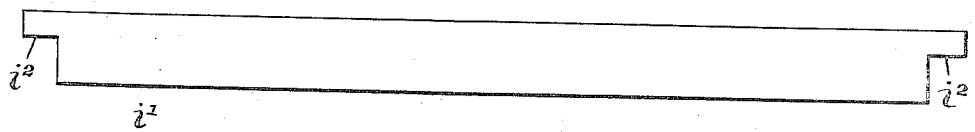
Figure 7:
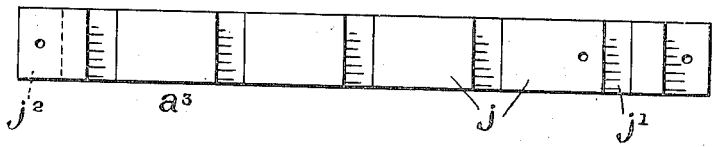
Figure 8:
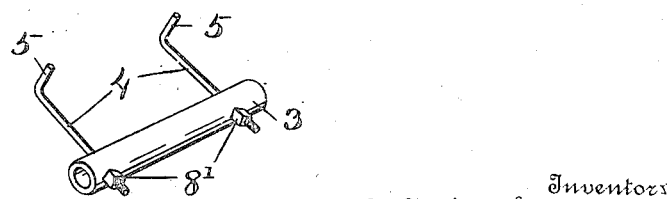

Figure 1 is a plan view of the flooring, partially assembled. Fig. 2 is a plan view of a portion of the flooring on a larger scale, partially assembled, and partially broken away. Fig. 3 is a section on the line 3—3, Fig. 2. Fig. 4 is a partial plan view showing the joists and beams and the connections therefor, disengaged or before assembling. Fig. 5 is a detail bottom plan view of one of the floor sections. Fig. 6 is a detail side view of one of the joist sections. Fig. 7 is a detail side view of one of the side beam sections. Fig. 8 is a detail perspective view of one of the rods and the hooked bolts thereof.

The invention has relation to knock down or portable sectional flooring, designed for use in skating rinks and other buildings and places, and it consists in the novel construction and combinations of parts as hereinafter set forth.

In the accompanying drawings illustrating the invention, the numeral 1, designates floor sections, mounted upon a base frame consisting of side beams $a$ and $a^2$, usually two by six inches in cross section, and abutting and held together at the corners by detachable means, such as bolts $b$ and $c$ at right angles to each other, one of said bolts ($b$) being an eye bolt, the eye of which is engaged by the other bolt. The side beams at two opposite sides are in convenient lengths or sections $a'$, each usually about fourteen feet long, the sections abutting at the ends and being held together by suitable detachable means, such as a clamp plate $d$, at the outer side, a bolt $e$, parallel to the clamp plate and engaging the eyes of eye bolts $f$ and $g$, passing through the clamp plate and through the ends of the beam sections.

Intermediate beams $h$, are provided at the abutting ends of each of the sections $a'$, and at right angles thereto, the bolt $e$, of the joint connection before referred to, passing through the ends of the intermediate beams. The other two opposite side beams $a^2$ of the base are in lengths or sections $a^3$, usually a little shorter than the lengths $a'$ of the other two side beams. The intermediate beams are usualy two by four inches in cross section and located with their upper faces below the upper faces or parts of the beams $a$, leaving space above the intermediate beams. The side beams $a^2$ and the intermediate beams $h$, are provided with cleats $j$ and $k$, respectively, upon the inner sides of the side beams and upon both sides of the intermediate beams, said cleats being arranged in short lengths with spaces $j'$ and $k'$ therebetween. The cleats $j$ have a lap joint $j^2$ with the abutting ends of the sections $a^3$ of the side beams $a^2$, and the cleats $k$ of the intermediate beams have a lap joint $k^2$ with the abutting ends of the sections of the intermediate beams.

The floor joists $i$, are parallel to the side beams $a$, and are in sections $i'$ of about the same length as the sections $a'$ of the beams $a$. The sections $i'$ of the joists $i$, fit in the spaces or seats between the cleats $j$ and $k$, the ends of the joists in said seats abutting against the ends of the cleats and against the beams. The ends of the intermediate sections $i'$ of the joists $i$ are notched at $i^2$, to lap over the intermediate beams $h$, the top faces of which are located below the top faces of the side beams. The top faces of the joists $i$ are on the same level as the top faces of the side beams.

Certain of the floor joists $i$, usually every fifth joist, are connected to the intermediate beams by suitable detachable means, usually a U-form bolt $l^x$, fitting in a notch of the intermediate beam $h$, the arms of said bolt passing through the abutting ends of the sections $i'$ of the fifth joist $i$. The end sections of the fifth joists $i$, are connected to the side beams $a^2$, by suitable detachable means, usually a right angle bolt $m$, one arm of which passes through the side beam and the other arm of which passes through the end of the section $i'$.

The entire frame is held or tied together laterally by rods or cables $n$, parallel to the sides $a$, and connected at the ends preferably to eye bolts $o$, said bolts passing through the lap joints $j^2$ of the sections of the side beams $a^2$ and the cleats $j$, to hold the frame together longitudinally. The eye bolts $o$ engage clamp plates $p$, at the outer sides of the side beams $a^2$.

The frame is designed to be set up over another floor in a building, or with sills and suitable underpinning in a building or outdoors.

The sections of the frame can be readily and quickly put together or taken down, and are all flat when taken apart, whereby they may be compactly piled one upon another for transportation or storage.

The side beams $a$, and certain of the floor joists $i$, usually every fifth joist, have passing therethrough and pivotally mounted therein at suitable intervals, a number of rods 3, 3, usually of gas pipe, and projecting oppositely from the sides of the joists. Each of said rods has at opposite ends and upon opposite sides of the joists, a bolt 4, at right angles to the rod, and provided with an angular or hooked free end 5.

The floor sections 1, are provided each with lower transverse cleats 6, parallel to the joists $i$. The end cleats 6 of each floor section are provided with holes or seats 8, with which the hooked ends of the bolts 4 are engaged. The center line of the floor is indicated at 9, and is parallel to the side beams $a^2$.

The flooring sections are laid upon the joists from the center line outward toward the sides. As each section is laid, it is engaged with the hooked ends of the bolts with their seats 8 in the end cleats, and the tongue and groove joint is engaged the ends of meeting sections, after which the nut 8' of the bolts are adjusted to draw the sections together and down to the joists and engage the tongue and groove joint at the sides of meeting sections.

Upon opposite sides of the center line 9, the hooked bolts extend in opposite directions away from said line, whereby said bolts exert an inward pull on the floor sections and an outward pull upon the joists and beams, the U-form connections between the joist sections holding the joist sections together against the outward pull of said bolts.

In dismantling or knocking down, all metal parts and connections are first removed from the woodwork, when the floor sections and beam and joist sections are separated and piled up flatwise to lessen the danger of warping and for packing in small space. This flooring is designed to be laid without necessity of crawling under the same to attach the fastenings, and is readily and quickly assembled and taken apart.

What we claim is:—

1. In sectional knock down flooring, floor joists, floor sections, having bottom cleats, and detachable means of connection between said joists and said sections having engagement with said cleats to simultaneously draw the floor sections laterally together and down to the joists.

2. In sectional knock down flooring, floor joists, floor sections, having bottom cleats, and detachable hooked bolts having seats in the bottom cleats and carrying rods engaging the joists to simultaneously draw the floor sections laterally together and down to the joists.

3. In sectional knock down flooring, floor joists, floor sections, having bottom cleats, rods engaging said joists, bolts engaging the rods and having hooked free ends seated in said cleats, and adjustable nuts upon the other ends of said bolts whereby the floor sections may be simultaneously drawn laterally together and down to said joists.

4. In sectional knock down flooring, floor joists, floor sections having bottom cleats and tongue and grooved ends and sides, said cleats having seats therein, rods engaging said joists, bolts engaging said rods and having hooked free ends engaging said seats upon endwise movement of the door sections to simultaneously engage the tongue and grooved ends of meeting sections, and nuts threaded upon the other ends of said bolts and adjustable to simultaneously draw the floor sections laterally together to engage the tongue and grooved sides of meeting sections, and down to said joists.

5. In sectional knock down flooring, floor joists, floor sections, and detachable means of connection between said joists and said sections to simultaneously draw the floor sections together and down to the joists, embodying rods extending transversely through the joists, bolts engaging perforations of said rods and extending at right angles thereto, and adjusting nuts threaded upon the bolts.

6. In sectional knock down flooring, a joist receiving frame composed of side beams, intermediate beams having their upper faces located below the tops of said side beams, floor joists at right angles to said intermediate beams and passing over and resting upon the same with their upper faces level with the upper faces of the side beams, floor sections having bottom cleats at right angles to and passing over said intermediate beams, and detachable means of connection between said joists and the floor sections to simultaneously draw said sections laterally together and down to the joists, including rods extending transversely through said joists, bolts engaging perforations of said rods and extending at right angles thereto, and nuts threaded upon said bolts.

7. In sectional knock down flooring, floor joists, floor sections, and detachable means for simultaneously drawing said floor sections laterally together and down to said joists, said means extending in opposite directions and acting to draw the floor sections upon opposite sides of the center line of the flooring toward each other.

In testimony whereof we affix our signatures, in presence of two witnesses.

J. QUINCY SMITH.
ARCHIE B. HOOVER.

Witnesses:
G. W. JENKINS,
D. E. BUTTS.